US006910099B1

(12) United States Patent
Wang et al.

(10) Patent No.: US 6,910,099 B1
(45) Date of Patent: Jun. 21, 2005

(54) DISK DRIVE ADJUSTING READ-AHEAD TO OPTIMIZE CACHE MEMORY ALLOCATION

(75) Inventors: Ming Y. Wang, Mission Viejo, CA (US); Gregory B. Thelin, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 310 days.

(21) Appl. No.: 10/262,469

(22) Filed: Sep. 30, 2002

(30) Foreign Application Priority Data

Oct. 31, 2001 (TW) ...................................... 90218866 U

(51) Int. Cl.[7] ................................................ G06F 12/00

(52) U.S. Cl. ........................ 711/113; 711/137; 711/141; 711/171; 710/52; 710/56

(58) Field of Search ................................ 711/112, 113, 711/133, 134, 141, 144, 145, 170, 171, 137; 710/52, 56

(56) References Cited

U.S. PATENT DOCUMENTS 4,489,378 A 12/1984 Dixon et al. .................. 710/33
5,890,211 A * 3/1999 Sokolov et al. ............. 711/113
5,937,426 A * 8/1999 Sokolov ...................... 711/113
5,966,726 A 10/1999 Sokolov ...................... 711/113
6,532,513 B1 * 3/2003 Yamamoto et al. ......... 711/100
6,757,781 B2 * 6/2004 Williams et al. ............ 711/112

OTHER PUBLICATIONS

Chang et al., "An Efficient Tree Cache Coherence Protocol for Distributed Shared Memory Multiprocessors", © 1999 IEEE, p. 352–360.*

Li et al., "Redundant Linked List Based Cache Coherence Protocol", © 1995 IEEE, p. 43–50.*

Gjessing, et al., "A Linked List Cache Coherence Protocol: Verifying the Bottom Layer", © 1991 IEEE, p. 324–329.*

* cited by examiner

*Primary Examiner*—Donald Sparks
*Assistant Examiner*—Brian R. Peugh
(74) *Attorney, Agent, or Firm*—Milad G. Shara, Esq.; Howard H. Sheerin, Esq.

(57) ABSTRACT

A disk drive is disclosed which receives a read command from a host computer, the read command comprising a command size representing a number of blocks of read data to read from the disk. A number M of cache segments are allocated from a cache buffer, wherein each cache segment comprises N blocks. The number M of allocated cache segments is computed by summing the command size with a predetermined default number of read-ahead blocks to generate a summation, and integer dividing the summation by N leaving a residue number of default read-ahead blocks. In one embodiment, the residue number of default read-ahead blocks are not read, in another embodiment the residue number of default read-ahead blocks are read if the residue number exceeds a predetermined threshold, and in yet another embodiment the number of read-ahead blocks is extended so that the summation divides evenly by N.

14 Claims, 9 Drawing Sheets

FREE_SEG_LIST[NUM_SIZES]

| INDEX | HEAD | COUNT |
| --- | --- | --- |
| 0 | 0 | 5 |
| 1 | 0 | 0 |
| 2 | 0 | 0 |
| 3 | 5 | 5 |
| 4 | 10 | 4 |
| 5 | 0 | 0 |
| 6 | 14 | 7 |
| 7 | 0 | 0 |

FIG. 6B

SEGMENT_LINK[SEGS]

| | INDEX | VALUE | |
| --- | --- | --- | --- |
| $HEAD_1$ → | 0 | 1 | 1 BLOCK SEGMENTS |
| | 1 | 2 | |
| | 2 | 3 | |
| | 3 | 4 | |
| | 4 | EOF | |
| $HEAD_8$ → | 5 | 6 | 8 BLOCK SEGMENTS |
| | 6 | 7 | |
| | 7 | 8 | |
| | 8 | 9 | |
| | 9 | EOF | |
| $HEAD_{16}$ → | 10 | 11 | 16 BLOCK SEGMENTS |
| | 11 | 12 | |
| | 12 | 13 | |
| | 13 | EOF | |
| $HEAD_{64}$ → | 14 | 15 | 64 BLOCK SEGMENTS |
| | 15 | 16 | |
| | 16 | 17 | |
| | 17 | 18 | |
| | 18 | 19 | |
| | 19 | 20 | |
| | 20 | EOF | |

FIG. 6A

SEGMENT_LINK[SEGS]

| INDEX | VALUE |
|---|---|
| 0 | 1 |
| 1 | 2 |
| 2 | 3 |
| 3 | 4 |
| 4 | EOF |
| 5 | 6 |
| 6 | 7 |
| 7 | 8 |
| 8 | 9 |
| 9 | EOF |
| 10 | 11 |
| 11 | 12 |
| 12 | 13 |
| 13 | EOF |
| 14 | 15 |
| 15 | 16 |
| 16 | 17 |
| 17 | EOF |
| 18 | 19 |
| 19 | 20 |
| 20 | EOF |

$HEAD_1$ → 0; $HEAD_8$ → 5; $HEAD_{16}$ → 10; $HEAD_{64}$ → 18

FIG. 7A

FREE_SEG_LIST[NUM_SIZES]

| INDEX | HEAD | COUNT |
|---|---|---|
| 0 | 0 | 5 |
| 1 | 0 | 0 |
| 2 | 0 | 0 |
| 3 | 5 | 5 |
| 4 | 10 | 4 |
| 5 | 0 | 0 |
| 6 | 18 | 3 |
| 7 | 0 | 0 |

FIG. 7B

SEGMENT_LINK[SEGS]

| INDEX | VALUE |
|---|---|
| 0 | EOF |
| 1 | 2 |
| 2 | 3 |
| 3 | 4 |
| 4 | EOF |
| 5 | 0 |
| 6 | 7 |
| 7 | 8 |
| 8 | 9 |
| 9 | EOF |
| 10 | 11 |
| 11 | 12 |
| 12 | 13 |
| 13 | EOF |
| 14 | 15 |
| 15 | 16 |
| 16 | 17 |
| 17 | EOF |
| 18 | 5 |
| 19 | 20 |
| 20 | EOF |

$HEAD_1$ $HEAD_8$ $HEAD_{16}$ $HEAD_{64}$

FIG. 8A

FREE_SEG_LIST[NUM_SIZES]

| INDEX | HEAD | COUNT |
|---|---|---|
| 0 | 1 | 4 |
| 1 | 0 | 0 |
| 2 | 0 | 0 |
| 3 | 6 | 4 |
| 4 | 10 | 4 |
| 5 | 0 | 0 |
| 6 | 19 | 2 |
| 7 | 0 | 0 |

FIG. 8B

FREE_SEG_LIST[NUM_SIZES]

| INDEX | HEAD | COUNT |
|---|---|---|
| 0 | 1 | 4 |
| 1 | 0 | 0 |
| 2 | 0 | 0 |
| 3 | 6 | 4 |
| 4 | 10 | 4 |
| 5 | 0 | 0 |
| 6 | 17 | 3 |
| 7 | 0 | 0 |

SEGMENT_LINK[SEGS]

| INDEX | VALUE |
|---|---|
| 0 | EOF |
| 1 | 2 |
| 2 | 3 |
| 3 | 4 |
| 4 | EOF |
| 5 | 0 |
| 6 | 7 |
| 7 | 8 |
| 8 | 9 |
| 9 | EOF |
| 10 | 11 |
| 11 | 12 |
| 12 | 13 |
| 13 | EOF |
| 14 | 15 |
| 15 | 16 |
| 16 | EOF |
| 17 | 19 |
| 18 | 5 |
| 19 | 20 |
| 20 | EOF |

DISK DRIVE ADJUSTING READ-AHEAD TO OPTIMIZE CACHE MEMORY ALLOCATION

CROSS REFERENCE TO RELATED APPLICATIONS AND PATENTS

This application is related to co-pending U.S. patent application Ser. No. 10/262,014 titled "DISK DRIVE EMPLOYING THRESHOLDS FOR CACHE MEMORY ALLOCATION" filed on Sep. 30, 2003 now U.S. Pat. No. 6,711,635, the disclosure of which is incorporated herein by reference.

BACKGROUND OF THE INVENTION

1. Field of the Invention

The present invention relates to disk drives for computer systems. More particularly, the present invention relates to a disk drive that adjusts a read-ahead to optimize cache memory allocation.

2. Description of the Prior Art

A disk drive typically comprises a cache memory for caching data written to the disk as well as data read from the disk. The overall performance of the disk drive is affected by how efficiently the cache memory can be allocated for a read command. In the past, the cache memory has been divided into cache segments each comprising a number of blocks (e.g., eight blocks), wherein the cache system would allocate a number of cache segments to process the read command. This technique is inefficient, however, if the number of blocks in a cache segment does not integer divide into the number of blocks associated with processing the read command leaving part of a cache segment allocated but unused.

SUMMARY OF THE INVENTION

The present invention may be regarded as a disk drive comprising a disk comprising a plurality of tracks, each track comprising a plurality of blocks, a head actuated radially over the disk, a semiconductor memory comprising a cache buffer for caching data written to the disk and data read from the disk, and a disk controller. A read command is received from a host computer, the read command comprising a command size representing a number of blocks of read data to read from the disk. A number M of cache segments are allocated from the cache buffer, where each cache segment comprises N blocks. The number M of allocated cache segments is computed by summing the command size with a predetermined default number of read-ahead blocks to generate a summation, and integer dividing the summation by N leaving a residue number of default read-ahead blocks. The read data is read from the disk and stored in part of the allocated cache segments. A read-ahead operation is adjusted in response to the residue number of default read-ahead blocks to read read-ahead data from the disk following the read data and storing the read-ahead data in a remainder of the allocated cache segments.

In one embodiment, the read-ahead operation is terminated prior to reading the residue number of default read-ahead blocks. In another embodiment, if the residue number of default read-ahead blocks exceeds a threshold, an additional cache segment is allocated, the residue number of default read-ahead blocks are read from the disk, and the residue number of default read-ahead blocks are stored in the additional cache segment. In still another embodiment, if the residue number of default read-ahead blocks is non-zero, an additional cache segment is allocated, the residue number of default read-ahead blocks are read from the disk, an extended number of read-ahead blocks are read from the disk, and the residue number of default read-ahead blocks and the extended number or read-ahead blocks are stored in the additional cache segment.

In one embodiment, the number of allocated cache segments is computed by summing a predetermined number of pre-read blocks with the command size and the predetermined default number of read-ahead blocks to generate the summation.

In yet another embodiment, the cache buffer comprises a plurality of cache segments each comprising P blocks where $P<N$, and the cache segments comprising P blocks are allocated for write commands. In one embodiment, the cache buffer comprises a plurality of segment pools, each segment pool comprises a plurality of cache segments, and each cache segment comprises $2^k$ number of blocks where k is a predetermined integer for each segment pool.

The present invention may also be regarded as a method of reading data through a head actuated radially over a disk in a disk drive. The disk comprises a plurality of tracks, each track comprising a plurality of blocks. The disk drive further comprises a cache buffer for caching read data. A read command is received from a host computer, the read command comprising a command size representing a number of blocks of read data to read from the disk. M cache segments are allocated from the cache buffer, wherein each cache segment comprises N blocks. The number M of allocated cache segments is computed by summing the command size with a predetermined default number of read-ahead blocks to generate a summation, and integer dividing the summation by N leaving a residue number of default read-ahead blocks. The read data is read from the disk and stored in part of the allocated cache segments. A read-ahead operation is adjusted in response to the residue number of default read-ahead blocks to read read-ahead data from the disk following the read data and storing the read-ahead data in a remainder of the allocated cache segments.

BRIEF DESCRIPTION OF THE DRAWINGS

FIG. 6A show an embodiment of the present invention wherein a SEGMENT_LINK data structure maintains a linked list of cache segments for respective read and write commands.

FIG. 6B shows an embodiment of the present invention wherein a FREE_SEG_LIST data structure maintains a head pointer and count for the free cache segments in each segment pool of FIG. 5.

FIGS. 7A–7B illustrate how the SEGMENT_LINK and FREE_SEG_LIST data structures are updated after allocating 4 sixty-four-block cache segments for a read command.

FIGS. 8A–8B illustrate how the SEGMENT_LINK and FREE_SEG_LIST data structures are updated after allocating 1 sixty-four-block cache segment, 1 eight-block cache segment, and 1 one-block cache segment for a write command.

DESCRIPTION OF THE PREFERRED EMBODIMENTS

Figure 1A:
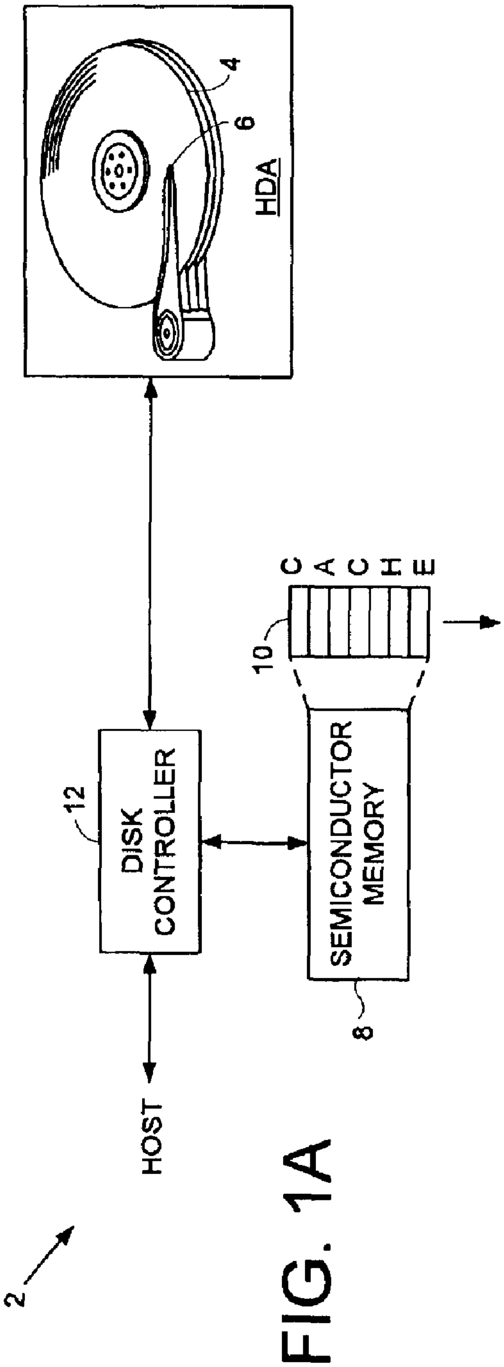
FIG. 1A shows a disk drive according to an embodiment of the present invention comprising a disk, a head actuated radially over the disk, a disk controller, and a semiconductor memory comprising a cache buffer for storing read data for read commands as well as read-ahead data for read commands.

FIG. 1A shows a disk drive 2 according to the present invention comprising a disk 4 having a plurality of tracks, where each track comprising a plurality of blocks. The disk drive 2 further comprises a head 6 is actuated radially over the disk 4, a semiconductor memory 8 comprising a cache buffer 10 for caching data written to the disk 4 and data read from the disk 4, and a disk controller 12. The disk controller 12 receives a read command from a host computer, where the read command comprises a command size representing a number of blocks of read data to read from the disk 4. The disk controller 12 allocates M cache segments from the cache buffer 10, where each cache segment comprises N blocks. The number M of allocated cache segments is computed by summing the command size with a predetermined default number of read-ahead blocks to generate a summation, and integer dividing the summation by N leaving a residue number of default read-ahead blocks. The read data is read from the disk 4 and stored in part of the allocated cache segments. A read-ahead operation is adjusted in response to the residue number of default read-ahead blocks to read the read-ahead data from the disk 4 following the read data and storing the read-ahead data in a remainder of the allocated cache segments.

Any suitable block size may be employed in the embodiments of the present invention, including the 512 byte block employed in a conventional IDE disk drive, the 1024 byte block employed in a conventional SCSI disk drive, or any other block size depending on the design requirements. In addition, any suitable default number of read-ahead blocks may be employed. In one embodiment, the default number of read-ahead blocks is selected relative to the size of the cache buffer 10. In another embodiment, the default number of read-ahead blocks is selected relative to the operating environment of the disk drive.

Figure 1B:
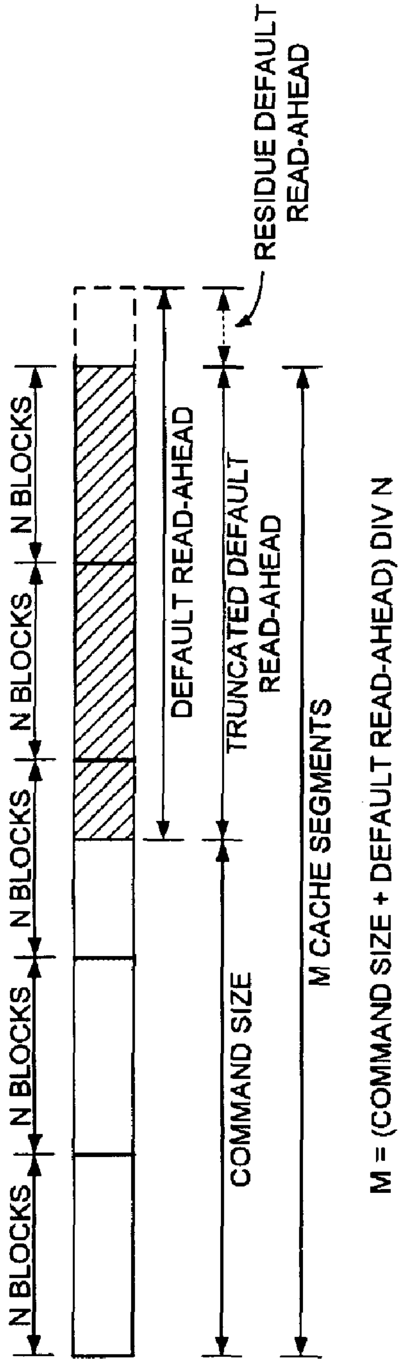
FIG. 1B shows an embodiment of the present invention wherein an exact-fit number of cache segments are allocated for a read command by truncating a default number of read-ahead blocks.

In one embodiment, the read-ahead operation is terminated prior to reading the residue number of default read-ahead blocks. This embodiment is illustrated by the example of FIG. 1B where the disk controller 12 allocates five cache segments each comprising N blocks. The default number of read-ahead blocks is truncated to avoid allocating a sixth cache segment that is filled only partially with the residue number of default read-ahead blocks.

Figure 2A:
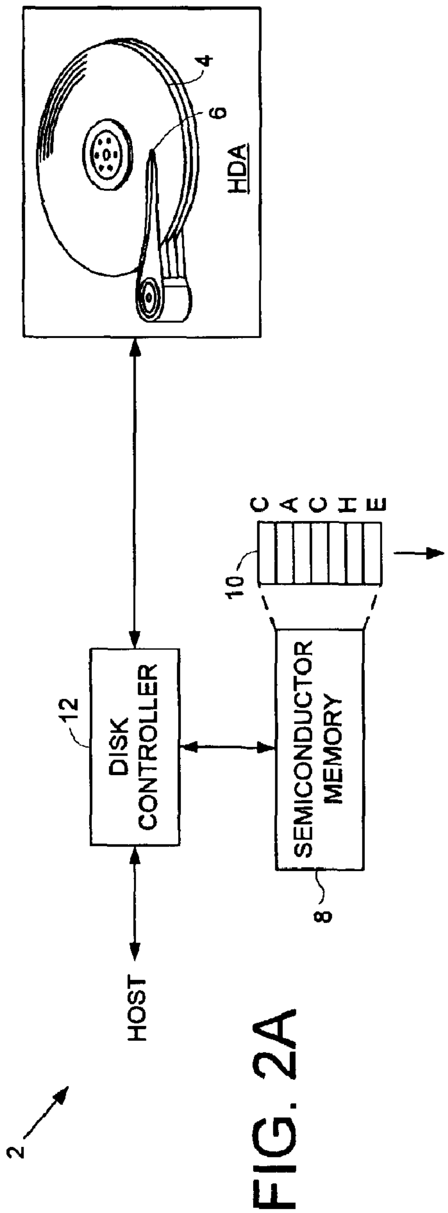
FIGS. 2A–2B show an embodiment of the present invention wherein a residue number of read-ahead blocks are read from the disk and stored in an additional cache segment if the residue number exceeds a threshold.
Figure 2B:
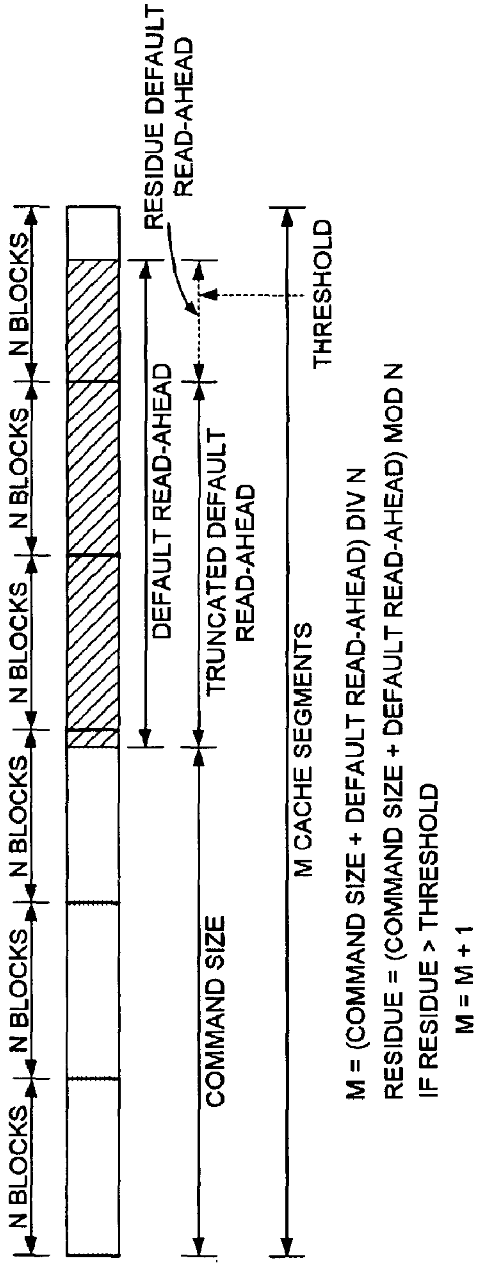

In another embodiment, if the residue number of default read-ahead blocks exceeds a threshold, an additional cache segment is allocated, the residue number of default read-ahead blocks are read from the disk 4, and the residue number of default read-ahead blocks are stored in the additional cache segment. This embodiment is illustrated by the example of FIGS. 2A–2B where the disk controller 12 allocates five cache segments plus an additional cache segment since the residue number of default read-ahead blocks exceeds a threshold. The additional cache segment is partially filled with the residue number of default read-ahead blocks. In one embodiment, a threshold of approximately 75% is employed to optimize the memory allocation of the additional cache segment.

Figure 3A:
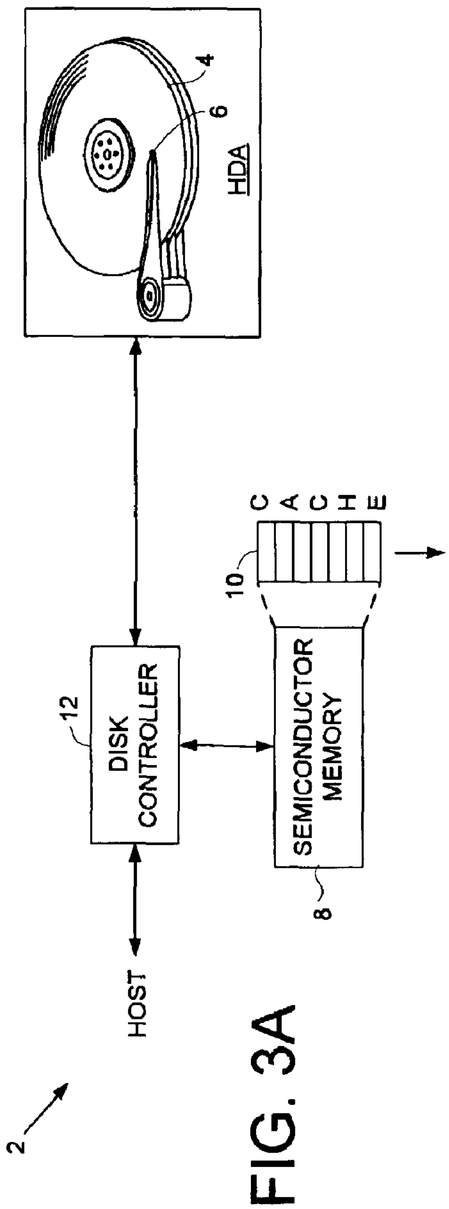
FIGS. 3A–3B show an embodiment of the present invention wherein a residue number of default read-ahead blocks and an extended number of read-ahead blocks are read from the disk and stored in an additional cache segment in order to achieve an exact-fit for the read-ahead data.
Figure 3B:
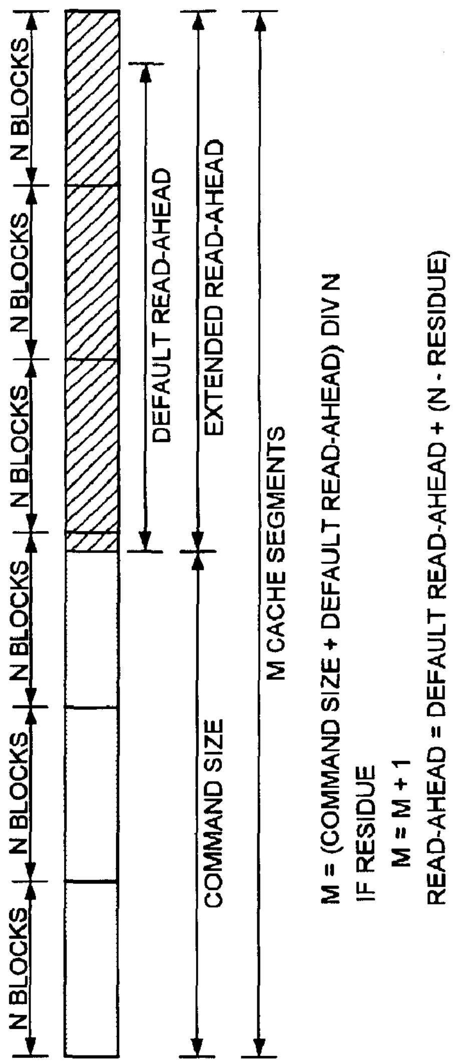

In still another embodiment, if the residue number of default read-ahead blocks is non-zero, an additional cache segment is allocated, the residue number of default read-ahead blocks are read from the disk 4, an extended number of read-ahead blocks are read from the disk 4, and the residue number of default read-ahead blocks and the extended number or read-ahead blocks are stored in the additional cache segment. This embodiment is illustrated by the example of FIGS. 3A–3B where the disk controller 12 allocates five cache segments plus an additional cache segment since the residue number of default read-ahead blocks is non-zero. The number of read-ahead blocks is extended so that the additional cache segment is filled completely with read-ahead data.

Figure 4A:
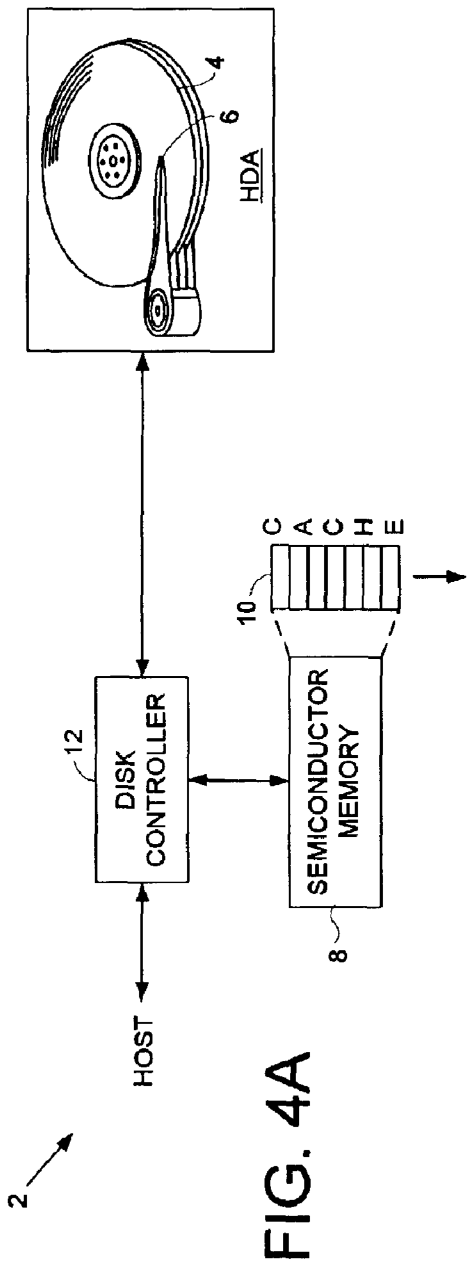
FIGS. 4A–4B show an embodiment of the present invention wherein an exact-fit number of cache segments are allocated for a read command, including a pre-read, by truncating a default number of read-ahead blocks.
Figure 4B:
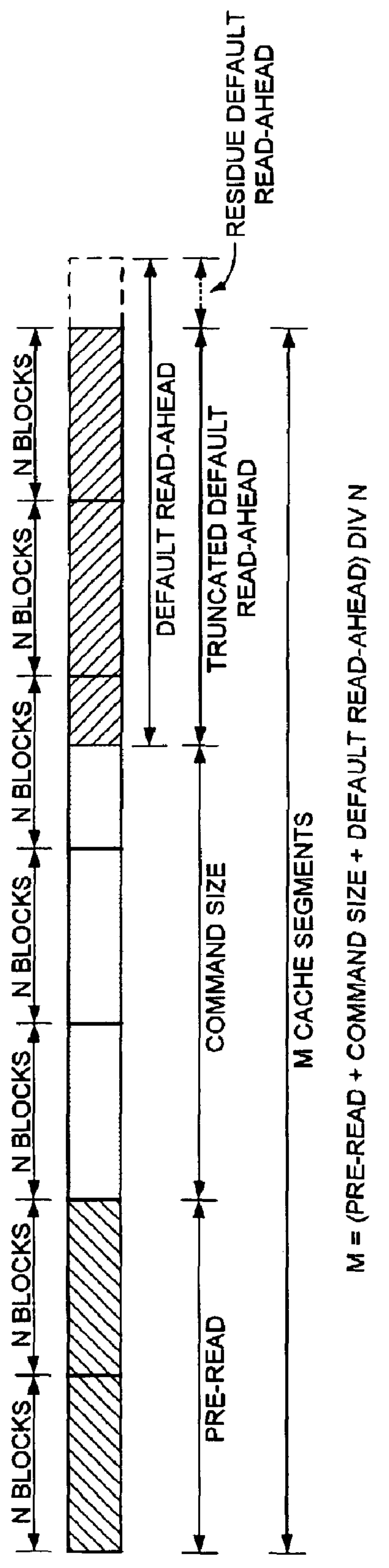

FIGS. 4A–4B illustrate an embodiment of the present invention wherein the number of allocated cache segments is computed by summing a predetermined number of pre-read blocks with the command size and the predetermined default number of read-ahead blocks to generate the summation similar to FIG. 1B. A number of pre-read blocks may also be employed in the embodiments of FIG. 2B and 3B.

Although truncating the read-ahead may degrade performance with respect to "cache-hits", in one embodiment the read-ahead is aborted intelligently to implement a rotational position optimization (RPO) algorithm. Therefore allocating cache segments by truncating the read-ahead has no impact on performance whenever the read-ahead is aborted to facilitate the RPO algorithm since the read-ahead is truncated anyway.

Figure 5:
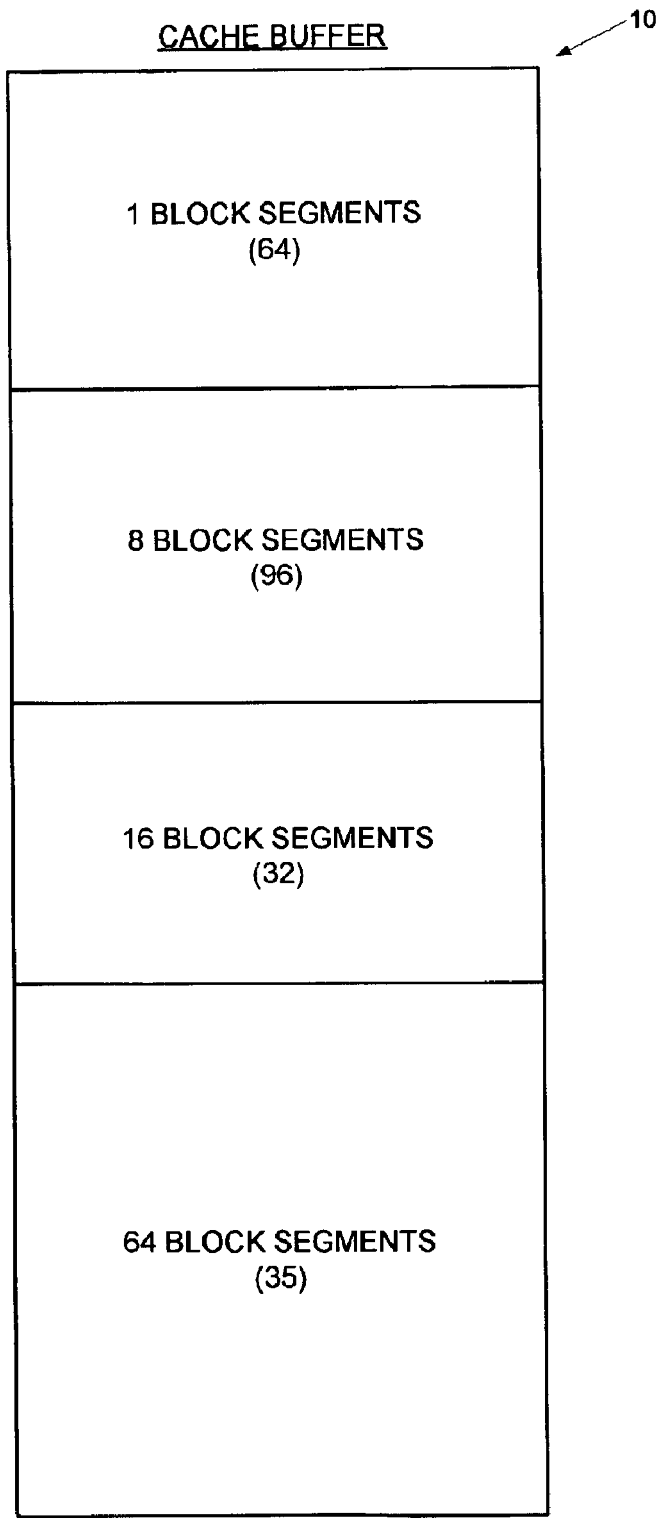
FIG. 5 shows an embodiment of the present invention wherein the cache buffer comprises a plurality of segment pools, each segment pool comprises a plurality of cache segments, and each cache segment comprises $2^k$ number of blocks where k is a predetermined value for each segment pool.

In one embodiment, the cache buffer 10 additionally comprises a plurality of cache segments each comprising P blocks where P<N, and the cache segments comprising P blocks are allocated for write commands. In one embodiment, the cache buffer 10 comprises a plurality of segment pools, each segment pool comprises a plurality of cache segments, and each cache segment comprises $2^k$ number of blocks where k is a predetermined integer for each segment pool. This embodiment is illustrated in FIG. 5 wherein the cache buffer 10 comprises 64 one-block cache segments, 96 eight-block cache segments, 32 sixteen-block cache segments, and 35 sixty-four-block cache segments. In this example, the disk controller 12 allocates memory only from the sixty-four-block cache segments to process a read command, whereas the disk controller 12 allocates memory from all of the cache segments for a write command to minimize the amount of allocated but unused cache memory. For example, truncating the read-ahead as in FIG. 1B assures that a read command will always use an integer number of sixty-four-block cache segments (i.e., exact-fit allocation). A write command can be fulfilled by allocating different size cache segments to achieve an "exact-fit" or "loose-fit" allocation. Details of a suitable "loose-fit" allocation scheme are disclosed in the above-referenced co-pending patent application entitled "DISK DRIVE EMPLOYING THRESHOLDS FOR CACHE MEMORY ALLOCATION".

FIG. 6A show an embodiment of the present invention wherein a SEGMENT_LINK data structure maintains a linked list of cache segments for respective read and write commands. The INDEX field identifies the segment number within the cache buffer 10, and the VALUE field points to the next cache segment within the link. The SEGMENT_LINK data structure is initialized so that the cache segments are linked together within each segment pool as illustrated in FIG. 6A. FIG. 6B shows a FREE_SEG_LIST data structure which maintains a HEAD pointer into each segment pool and COUNT field which identifies the number of free cache segments within each segment pool. The INDEX field of the FREE_SEG_LIST data structure corresponds to the segment pool size (i.e., $2^k$ number of blocks). In this example, the cache buffer 10 comprises 5 one-block cache segments, 5 eight-block cache segments, 4 sixteen-block cache segments, and 7 sixty-four-block cache segments. The HEAD pointer is initialized to the first cache segment of each segment pool as illustrated in FIG. 6A and 6B.

FIGS. 7A–7B illustrate how the SEGMENT_LINK and FREE_SEG_LIST data structures are updated after allocating 4 sixty-four-block cache segments for a read command. Each new cache segment is allocated from the $HEAD_{64}$ pointer, and the $HEAD_{64}$ pointer is re-assigned to point to the cache segment specified in the VALUE field. The VALUE field of the last cache segment allocated (17 in this example) is assigned EOF to identify it as the end of the link. As shown in FIG. 7B, after allocating the 4 sixty-four-block cache segments the $HEAD_{64}$ pointer (corresponding to INDEX 6 in the FREE_SEG_LIST) points to cache segment 18, and the COUNT field is decremented by 4.

FIGS. 8A–8B illustrate how the SEGMENT_LINK and FREE_SEG_LIST data structures are updated after allocating 1 sixty-four-block cache segment, 1 eight-block cache segment, and 1 one-block cache segment for a write command. The sixty-four-block cache segment is allocated from the $HEAD_{64}$ pointer, and the $HEAD_{64}$ pointer is re-assigned to its VALUE field (i.e., to cache segment 19). The VALUE field for the cache segment 18 is assigned to the $HEAD_8$ pointer (i.e., cache segment 5), and the $HEAD_8$ pointer is re-assigned to its VALUE field (i.e., to cache segment 6). The VALUE field for the cache segment 5 is assigned to the $HEAD_1$, pointer (i.e., cache segment 0), and the $HEAD_1$, pointer is re-assigned to its VALUE field (i.e., to cache segment 1). The VALUE field for the cache segment 0 is assigned EOF since it identifies the end of the link. The COUNT fields in the 0, 3 and 6 entries of the FREE_SEG_LIST are decremented by one.

Figures 9A, 9B:
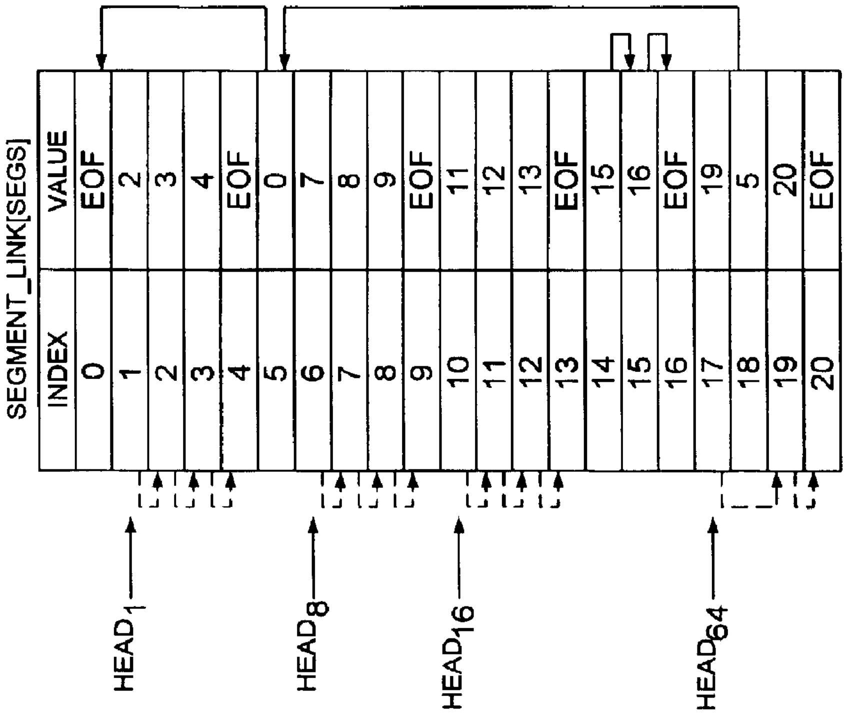
FIGS. 9A–9B illustrate how the SEGMENT_LINK and FREE_SEG_LIST data structures are updated after de-allocating 1 of the sixty-four-block cache segments for the read command of FIG. 7A.

FIGS. 9A–9B illustrate how the SEGMENT_LINK and FREE_SEG_LIST data structures are updated after de-allocating 1 of the sixty-four-block cache segments for the read command of FIG. 7A. In this embodiment, the last cache segment of the link (cache segment 17) is de-allocated first. The VALUE field of the de-allocated cache segment is assigned to the $HEAD_{64}$ pointer (i.e., to cache segment 19), and the $HEAD_{64}$ pointer is re-assigned to the de-allocated cache segment (i.e., to cache segment 17). The COUNT field in the 6 entry of the FREE_SEG_LIST is incremented by one.

We claim:

1. A disk drive comprising:

(a) a disk comprising a plurality of tracks, each track comprising a plurality of blocks;

(b) a head actuated radially over the disk;

(c) a semiconductor memory comprising a cache buffer for caching data written to the disk and data read from the disk; and (d) a disk controller for:

receiving a read command from a host computer, the read command comprising a command size representing a number of blocks of read data to read from the disk;

allocating M cache segments from the cache buffer, wherein:

each of the M cache segment comprises N blocks; and the number M of allocated cache segments is computed by:

summing the command size with a predetermined default number of read-ahead blocks to generate a summation; and integer dividing the summation by N which results in a residue number of default read-ahead blocks;

reading the read data from the disk and storing the read data in part of the allocated cache segments; and adjusting a read-ahead operation in response to the residue number of default read-ahead blocks to read read-ahead data from the disk following the read data and storing the read-ahead data in a remainder of the allocated cache segments.

2. The disk drive as recited in claim 1, wherein the read-ahead operation is terminated prior to reading the residue number of default read-ahead blocks.

3. The disk drive as recited in claim 1, wherein if the residue number of default read-ahead blocks exceeds a threshold, the disk controller for:

(a) allocating an additional cache segment;

(b) reading the residue number of default read-ahead blocks from the disk; and (c) storing the residue number of default read-ahead blocks in the additional cache segment.

4. The disk drive as recited in claim 1, wherein if the residue number of default read-ahead blocks is non-zero, the disk controller for:

(a) allocating an additional cache segment;

(b) reading the residue number of default read-ahead blocks from the disk;

(c) reading an extended number of read-ahead blocks from the disk; and (d) storing the residue number of default read-ahead blocks and the extended number of read-ahead blocks in the additional cache segment.

5. The disk drive as recited in claim 1, wherein the number of allocated cache segments is computed by summing a predetermined number of pre-read blocks with the command size and the predetermined default number of read-ahead blocks to generate the summation.

6. The disk drive as recited in claim 1, wherein:

(a) the cache buffer comprises a plurality of cache segments each comprising P blocks where P<N; and (b) the disk controller for allocating the cache segments comprising P blocks for write commands.

7. The disk drive as recited in claim 6, wherein:

(a) the cache buffer comprises a plurality of segment pools;

(b) each segment pool comprises a plurality of cache segments; and (c) each cache segment comprises $2^k$ number of blocks where k is a predetermined integer for each segment pool.

8. A method of reading data through a head actuated radially over a disk in a disk drive, the disk comprising a plurality of tracks, each track comprising a plurality of blocks, the disk drive comprising a cache buffer for caching read data, the method comprising the steps of:

(a) receiving a read command from a host computer, the read command comprising a command size representing a number of blocks of read data to read from the disk;

(b) allocating M cache segments of the cache buffer, wherein:

each of the M cache segments comprises N blocks; and the number M of allocated cache segments is computed by:

summing the command size with a predetermined default number of read-ahead blocks to generate a summation; and integer dividing the summation by N which results in a residue number of default read-ahead blocks;

(c) reading the read data from the disk and storing the read data in part of the allocated cache segments; and (d) adjusting a read-ahead operation in response to the residue number of default read-ahead blocks to read read-ahead data from the disk following the read data and storing the read-ahead data in a remainder of the allocated cache segments.

9. The method of reading data as recited in claim 8, further comprising the step of terminating the read-ahead operation prior to reading the residue number of default read-ahead blocks.

10. The method of reading data as recited in claim 8, wherein if the residue number of default read-ahead blocks exceeds a threshold, further comprising the steps of:

(a) allocating an additional cache segment;

(b) reading the residue number of default read-ahead blocks from the disk; and (c) storing the residue number of default read-ahead blocks in the additional cache segment.

11. The method of reading data as recited in claim 8, wherein if the residue number of default read-ahead blocks is non-zero, further comprising the steps of:

(a) allocating an additional cache segment;

(b) reading the residue number of default read-ahead blocks from the disk;

(c) reading an extended number of read-ahead blocks from the disk; and (d) storing the residue number of default read-ahead blocks and the extended number of read-ahead blocks in the additional cache segment.

12. The method of reading data as recited in claim 8, wherein the number of allocated cache segments is computed by summing a predetermined number of pre-read blocks with the command size and the predetermined default number of read-ahead blocks to generate the summation.

13. The method of reading data as recited in claim 8, wherein the cache buffer comprises a plurality of cache segments each comprising P blocks where $P<N$, further comprising the step of allocating the cache segments comprising P blocks for write commands.

14. The method of reading data as recited in claim 13, wherein:

(a) the cache buffer comprises a plurality of segment pools;

(b) each segment pool comprises a plurality of cache segments; and (c) each cache segment comprises $2^k$ number of blocks where k is a predetermined integer for each segment pool.

* * * * *